(12) United States Patent
Phillips et al.

(10) Patent No.: US 10,986,074 B2
(45) Date of Patent: Apr. 20, 2021

(54) METHODS AND RESOURCES FOR GENERATING SECURE COMMUNICATIONS

(71) Applicant: ARM IP Limited, Cambridge (GB)

(72) Inventors: Amyas Edward Wykes Phillips, Cambridge (GB); Milosch Meriac, Cambridge (GB)

(73) Assignee: ARM IP Limited, Cambridge (GB)

( * ) Notice: Subject to any disclaimer, the term of this patent is extended or adjusted under 35 U.S.C. 154(b) by 175 days.

(21) Appl. No.: 15/434,510

(22) Filed: Feb. 16, 2017

(65) Prior Publication Data

US 2017/0250806 A1    Aug. 31, 2017

(30) Foreign Application Priority Data

Feb. 25, 2016   (GB) ..................... 1603262

(51) Int. Cl.
*H04L 9/06* (2006.01)
*H04L 9/00* (2006.01)
*H04W 12/04* (2021.01)
*H04L 29/06* (2006.01)
*H04W 4/70* (2018.01)
*H04L 9/08* (2006.01)
*H04L 9/14* (2006.01)
*H04W 12/00* (2021.01)

(52) U.S. Cl.
CPC .......... *H04L 63/045* (2013.01); *H04L 9/0861* (2013.01); *H04L 9/0891* (2013.01); *H04L 9/14* (2013.01); *H04L 63/061* (2013.01); *H04W 4/70* (2018.02); *H04W 12/003* (2019.01); *H04L 2209/80* (2013.01)

(58) Field of Classification Search
None
See application file for complete search history.

(56) References Cited

U.S. PATENT DOCUMENTS

| | | | |
|---|---|---|---|
| 5,227,613 A * | 7/1993 | Takagi | G06K 7/0008 235/380 |
| 8,566,247 B1 | 10/2013 | Nagel et al. | |
| 2004/0162980 A1 | 8/2004 | Lesenne et al. | |
| 2014/0331050 A1 * | 11/2014 | Armstrong | H04L 9/0855 713/171 |

OTHER PUBLICATIONS

Combined Search and Examination Report for GB1603262.5, dated Oct. 3, 2016, 6 pages.
Search Report for GB1603262.5 dated Feb. 1, 2017, 2 pages.
Online http://crypto.stackexchange.com/questions/5630/deriving-keys-for-symmetric-encryption-and-authentication/5640#5640 , Dec. 8, 2012, 4 pages.

* cited by examiner

*Primary Examiner* — Alexander Lagor
(74) *Attorney, Agent, or Firm* — Nixon & Vanderhye P.C.

(57) ABSTRACT

A method of generating wireless communications from a transmit-only device, the method comprising: generating, at the transmit-only device, a first current session key; generating, at the transmit-only device, operational data; generating, at the transmit-only device, crypto-data by performing a cryptographic operation on the operational data using the first current session key; transmitting, from the transmit-only device, a first identifier to enable a resource derive the first current session key; transmitting, from the transmit-only device, the crypto-data.

15 Claims, 9 Drawing Sheets

METHODS AND RESOURCES FOR GENERATING SECURE COMMUNICATIONS

Figure 1:
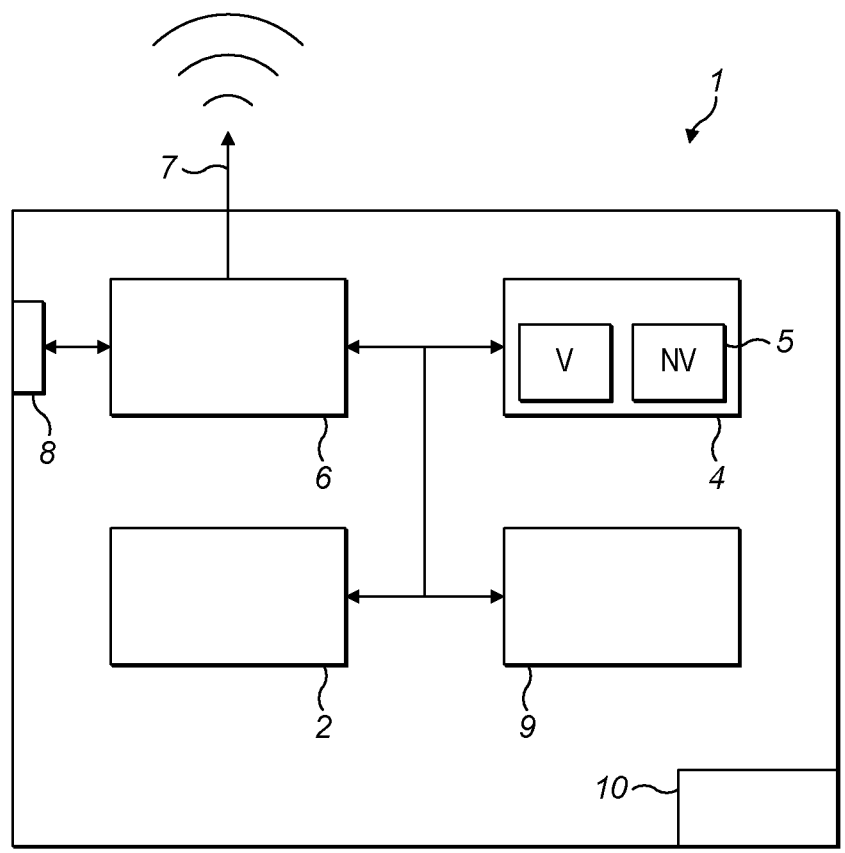

This application claims priority to GB Patent Application No. 1603262.5 filed 25 Feb. 2016, the entire contents of which is hereby incorporated by reference.

The present techniques relate to generating secure transmissions by data processing devices, and relates particularly, but not exclusively, to generating secure wireless transmissions by transmit-only devices.

There are ever increasing numbers of data processing devices having processing and communication capabilities, which allow for interaction between such data processing devices and resources, such as other data processing devices, objects and web services, across different environments as part of the 'Internet of Things' (IoT).

For example, a heating system in the home may gather information from various temperature sensing data processing devices provided in a network (e.g. a mesh network) in the home and control the activation of heaters based on the gathered information; or a factory pollution monitoring resource may gather information from various chemical sensing data processing devices in a factory network and arrange maintenance via the internet based on the gathered information.

In IoT applications, such data processing devices, hereinafter 'IoT devices' generally have minimal security capabilities such that they tend to be vulnerable to an attack by a $3^{rd}$ party. As an example, an attacker may, using a rogue device, intercept communications, comprising one or more packets of data, destined for the IoT device and modify/forge data before transmitting the modified/forged data to the IoT device so as to compromise the IoT device.

The present techniques seek to address the aforementioned problems.

According to a first technique, there is provided a method of generating wireless communications from a transmit-only device, the method comprising: generating, at the transmit-only device, a first current session key; generating, at the transmit-only device, operational data; generating, at the transmit-only device, crypto-data by performing a cryptographic operation on the operational data using the first current session key; transmitting, from the transmit-only device, a first identifier to enable a resource derive the first current session key; transmitting, from the transmit-only device, the crypto-data.

According to a second technique, there is provided a method of deriving a current session key generated at a transmit-only device by a first resource, the method comprising: receiving, at the first resource, from the transmit-only device, a first identifier to enable the first resource derive the current session key; deriving, at the first resource, the current session key using data stored at the first resource in response to the first identifier.

According to a third technique, there is provided a method of receiving wireless communications at a first resource from a transmit-only device, the method comprising: generating, at the transmit-only device, a first current session key; generating, at the transmit-only device, operational data; generating, at the transmit-only device, crypto-data by performing a cryptographic operation on the operational data using the first current session key; transmitting, from the transmit-only device, a first identifier to enable a resource derive the first current session key; transmitting, from the transmit-only device, the crypto-data; receiving, at the first resource, the first identifier; performing, at the first device, one of: deriving the first current session key; and transmitting the first identifier to a second resource when not capable of deriving the first session key.

According to a fourth technique, there is provided a method of provisioning a cryptographic key on a data processing device by a resource, the cryptographic key corresponding to a current session key on a transmit-only device, the method comprising: receiving, at the resource, a first identifier to enable a resource derive the first current session key; verifying, at the resource, an authorisation status of the data processing device; generating, at the resource, the cryptographic key in response to the first identifier; transmitting, from the resource to the data processing device, the cryptographic key based on the authorisation status.

Figure 2:
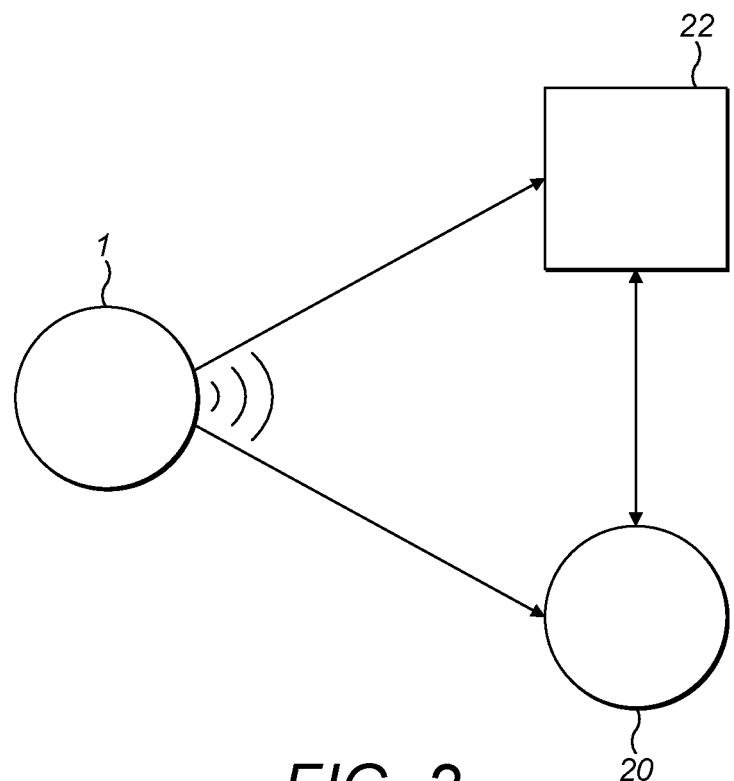
Figure 3:
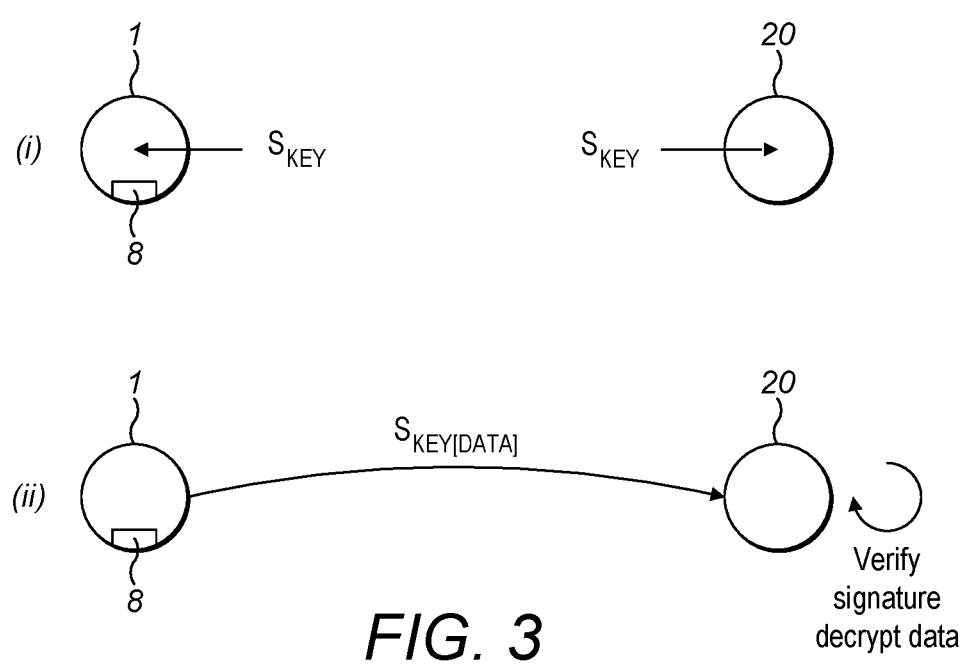
Figure 4:
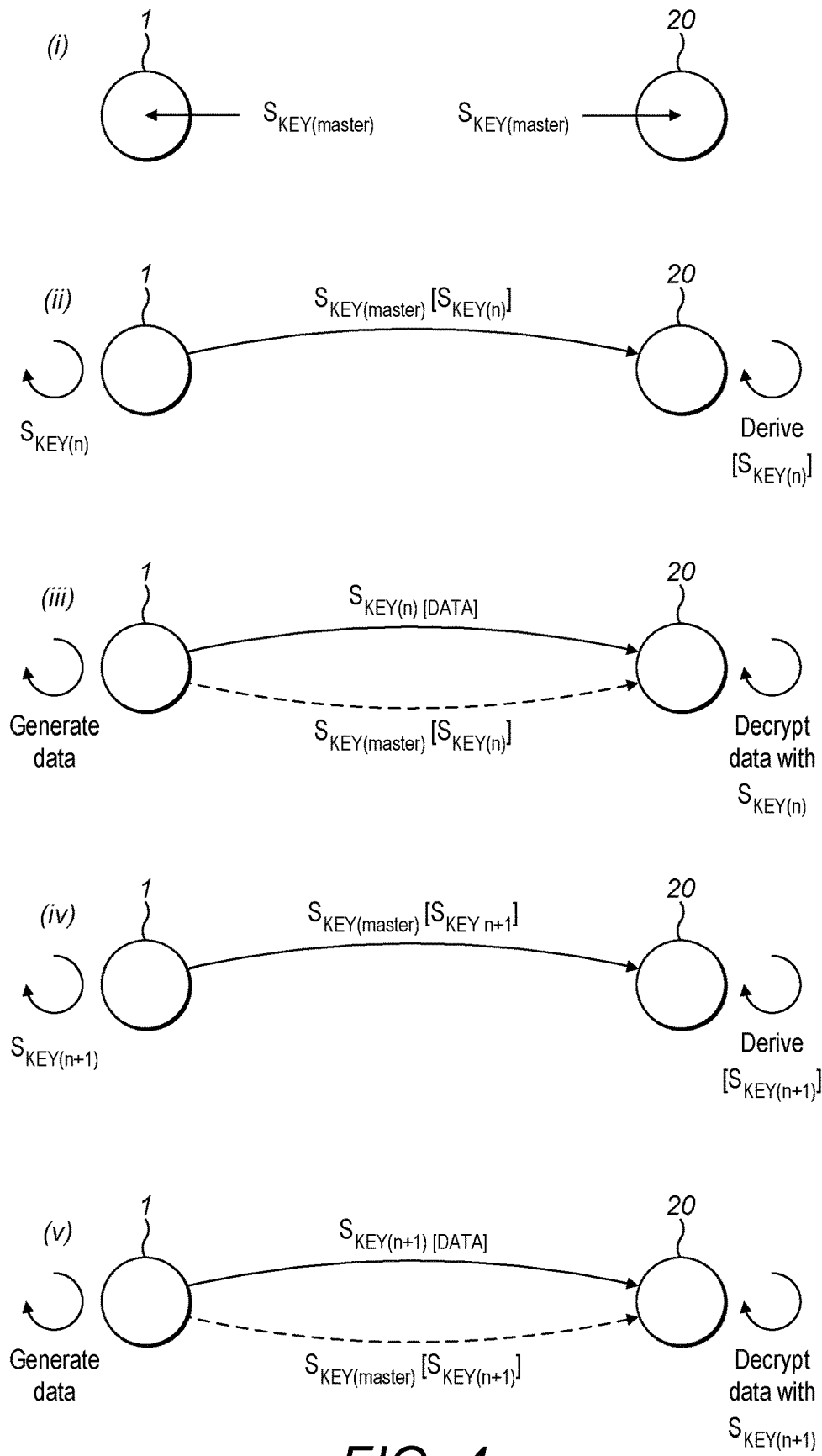
Figure 5:
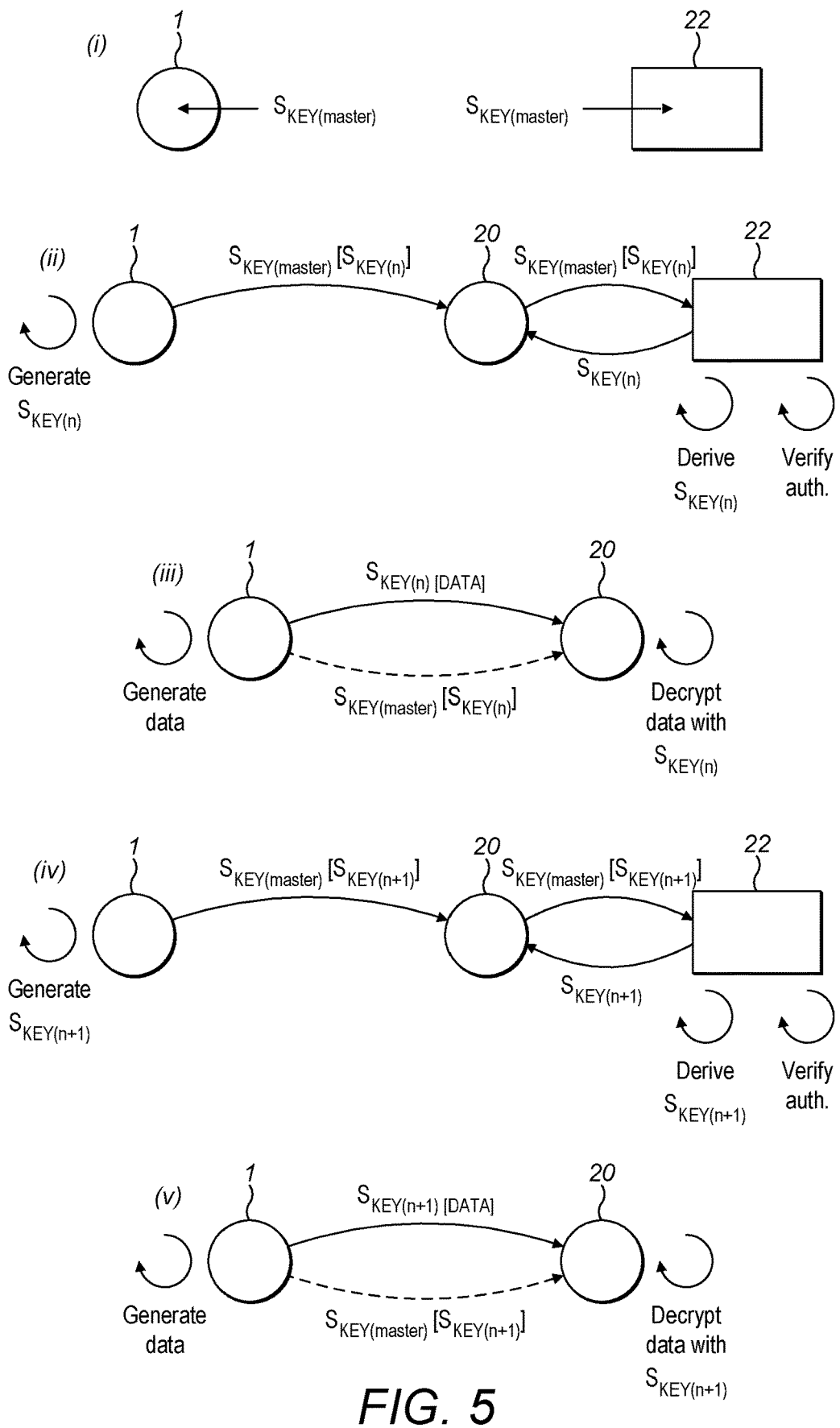
Figure 6:
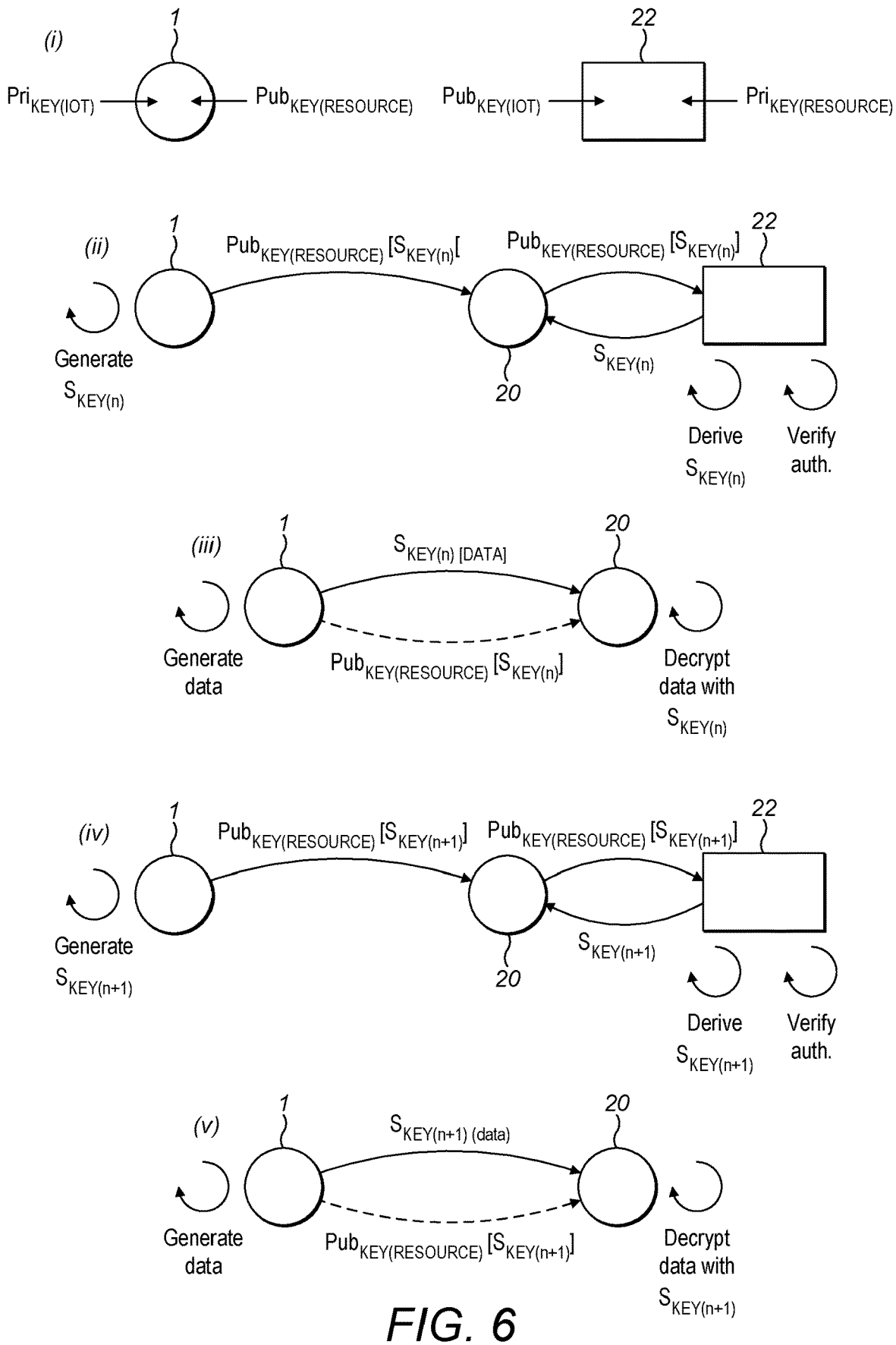
Figure 7:
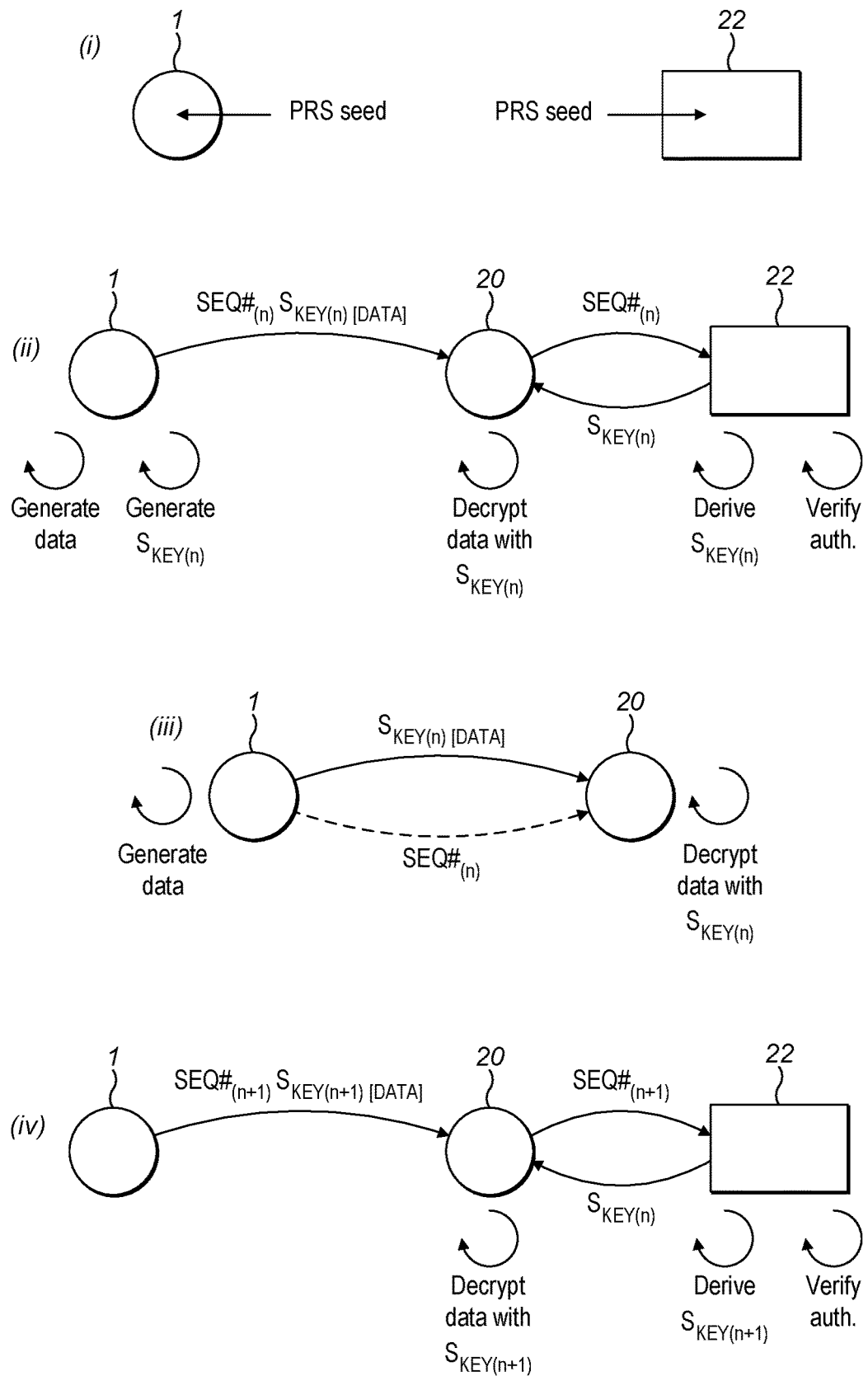
Figure 8:
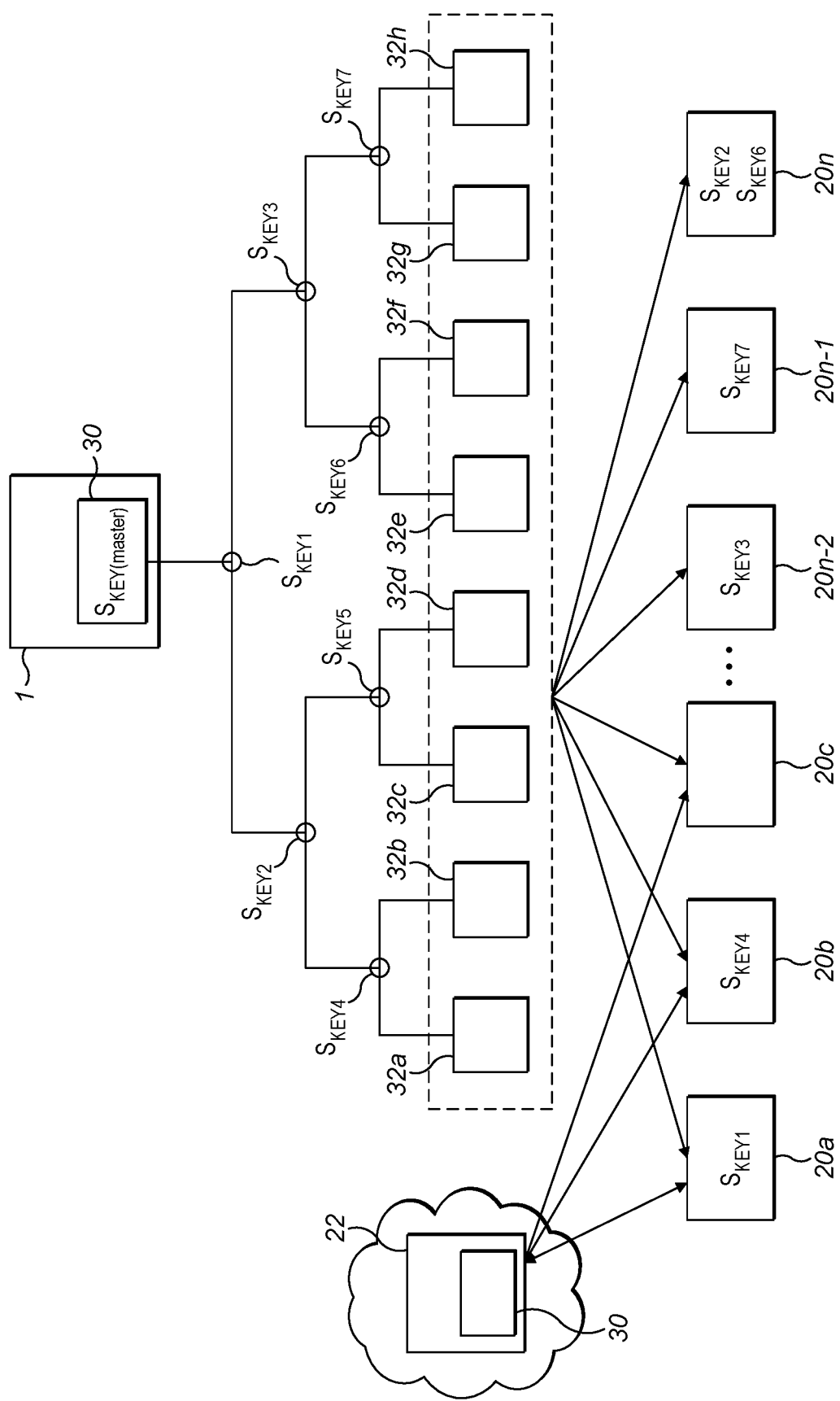
Figure 9A:
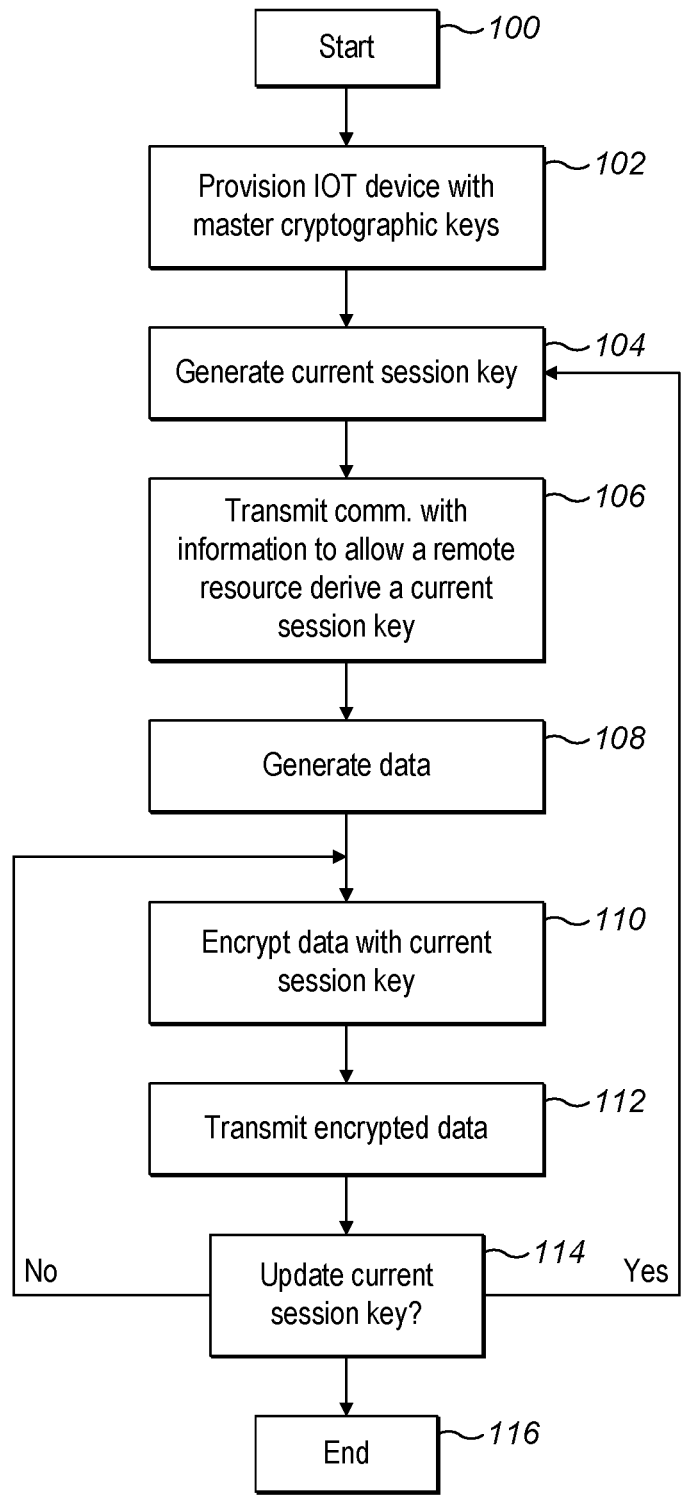
Figure 9B:
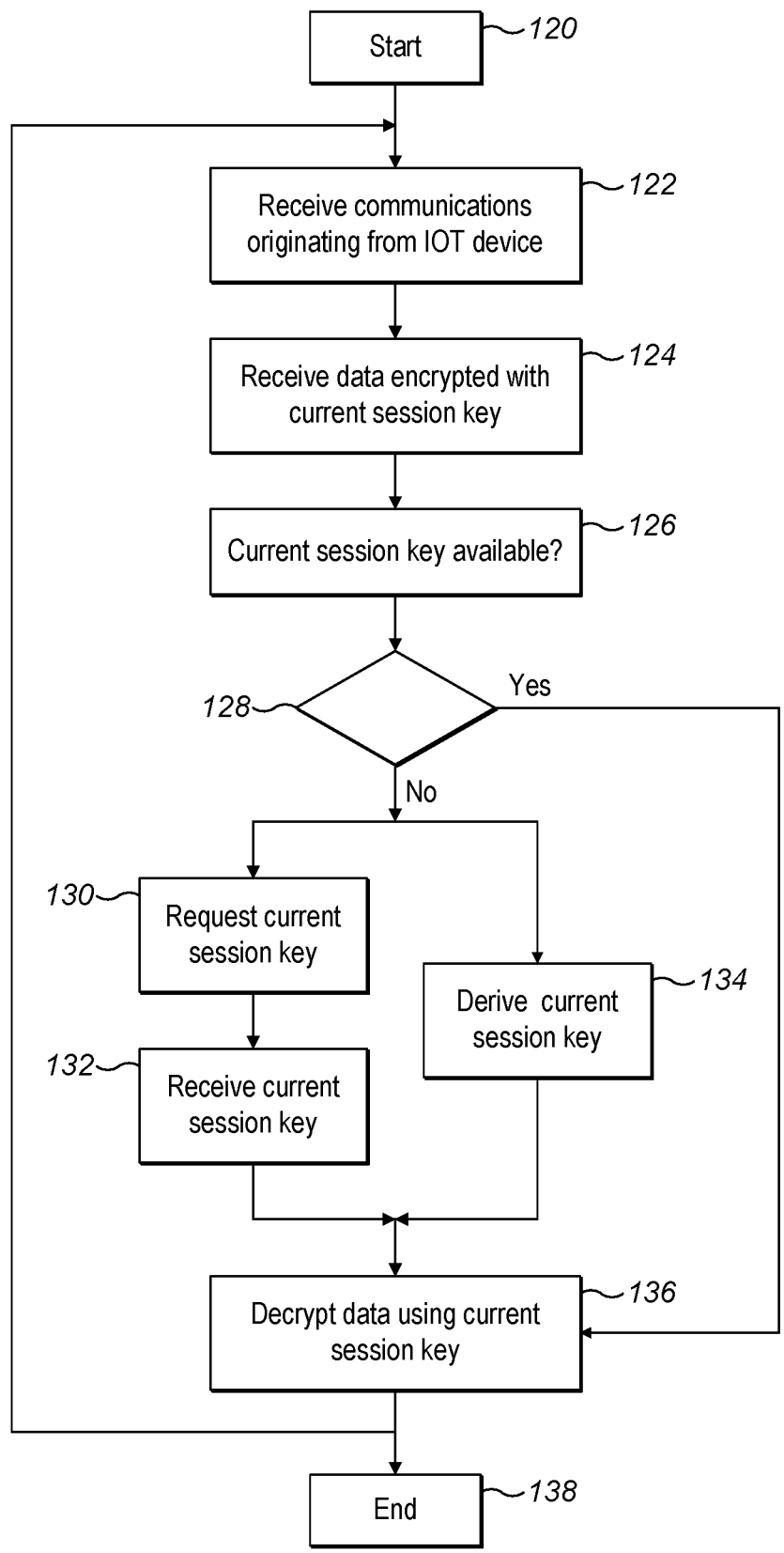

Embodiments will now be described with reference to the accompanying figures of which:

FIG. 1 schematically shows an example of an IoT device for use with the present techniques;

FIG. 2 schematically shows the IoT device 1 in wireless communication with a plurality of resources;

FIG. 3 schematically shows communications between IoT device and a data processing device in an example IoT application;

FIG. 4 schematically shows communications between the IoT device and data processing device according to an embodiment;

FIG. 5 schematically shows communications between the IoT device and data processing device according to a further embodiment;

FIG. 6 schematically shows communications the IoT device and data processing device according to a further embodiment;

FIG. 7 schematically shows communications between the IoT device and data processing device according to a further embodiment;

FIG. 8 schematically shows a structured session key for use in communications between the IoT device and data processing device according to a further embodiment;

FIG. 9a schematically shows an example method of an IoT device generating and transmitting data encrypted using a current session key to one or more resources; and FIG. 9b schematically shows an example method of a resource deriving a current session key based on the transmission from the IoT device.

FIG. 1 schematically shows an example of an IoT device 1 for use with the present techniques. The circuitry of the IoT device 1 includes processing element 2 coupled to a storage element 4, communication circuitry 6 and input/output (I/O) circuitry 9.

The processing element 2 may comprise processing circuitry provided to carry out instructions of a program by performing the basic arithmetic, logical, control and input/output (I/O) operations specified by the instructions.

The storage element 4 may comprise, for example, memory circuitry 4 having volatile (V) memory (e.g. RAM) and non-volatile (NV) memory 5 (e.g. flash memory or ROM). The memory circuitry 4 may store the programs executed by the processing element 2, as well as data such as credentials. Such credentials may include shared secret(s), for example, a cryptographic key which corresponds to a cryptographic key on a remote resource for authentication/encryption of communications comprising one or more packets of data transmitted therebetween.

The communication circuitry 6 enables communication with remote devices (not shown in FIG. 1). The communication circuitry 6 may use wireless communication 7 over one or more channels, such as, for example, wireless local area network (e.g. WiFi), short range communication such as radio frequency identification (RFID), near field communication (NFC), or communications channels used in wireless sensor networks such as ZigBee, Thread, Bluetooth and/or Bluetooth Low energy (BLE). Additionally, or alternatively, the communication circuitry 6 may use a cellular network such as 3G or 4G. The communication circuitry 6 may also use wired communication such a fibre optic or metal cable (e.g. Universal Serial Bus) via a physical data port 8, whereby a device reads and/or writes data from/to the memory circuitry 4. The communication circuitry 6 could also use two or more different forms of wireless or wired communication, such as several of the examples given above in combination. In the embodiments hereinafter described, the IoT devices 1 are configured as transmit-only devices, operable to transmit data via wireless communication, but not receive data via wireless communication.

The I/O circuitry 9 may comprise sensing circuitry to sense inputs from the surrounding environment, (e.g. vibrations, temperatures, tamper detection) and/or to provide an output to a user e.g. using a buzzer or light emitting diode(s) (not shown).

The IoT device 1 may generate operational data, which relates to the operation of the device, e.g. based on the sensed inputs and/or device status, whereby the operational data may be stored in the memory circuitry 4 and processed by the processor circuitry 2.

The IoT device 1 also comprises a power source 10. In FIG. 1, the power source is a battery (e.g. a lithium coin cell), although any suitable power source may be used (e.g. an AC or DC mains power supply; solar power, wind power etc.).

It will be appreciated that the IoT device 1 may comprise other hardware/software components not described herein depending on the specific functionality of the IoT device 1.

FIG. 2 schematically shows an IoT device 1 in communication with a plurality of resources 20/22, whereby the IoT device 1 is configured to transmit communications to resources 20/22 using any suitable wireless communications protocols, such as: BLE, Bluetooth or ZigBee. The IoT device 1 may also transmit communications to other resources (not shown).

The resources 20/22 may comprise any suitable device or service, for example: a data processing device (e.g. an IoT device configured to receive communications), a server e.g. running a web application programming interface (API), a registry and/or a web service.

The wireless communications from the IoT device 1 may comprise broadcast transmissions, such that any resource 20/22 in communication range of the IoT device may receive the broadcast. Therefore, transmissions are not limited to uni-cast or multi-cast transmissions.

However, it will be appreciated that data in communications may have a level of risk, in that the confidentiality, authenticity and/or integrity of the data in such communications may only be verifiable if the communications are subjected to a cryptographic operation before transmission (e.g. encryption or signing). However, in order to undertake a cryptographic operation, the IoT device 1 requires one or more cryptographic keys to be provisioned thereon.

For constrained devices (e.g. power constrained/processor/memory constrained), such as IoT devices herein described, the security of communications may be reduced to conserve energy. Therefore, in order to conserve energy in IoT applications, the IoT device 1 may be configured to transmit communications without signing and/or encrypting the communications.

Therefore, a third party device may intercept communications transmitted from the IoT device and may be able to read the non-encrypted data therewithin. Furthermore still, in some cases, a rogue third party device may transmit communications comprising malware purporting to be from the IoT device 1, which may cause issues for the receiving resources.

In order to provide a level of security for wireless communications transmitted from the IoT device 1 to the resource 20/22, both the IoT device 1 and the receiving resources are provisioned with corresponding cryptographic keys.

The provisioning of cryptographic keys on the IoT device 1 may occur at manufacture or deployment thereof, whereby one or more cryptographic keys are stored within memory circuitry thereon e.g. via a programing interface using physical data port.

The cryptographic keys may comprise symmetric keys, asymmetric keys or any suitable secret for encrypting and/or signing communications.

It will be appreciated that asymmetric keys are primarily used in two-way negotiations or to transport symmetric keys. Negotiations using asymmetric keys cannot feasibly be implemented using transmit-only devices, and, therefore, the functionality and security capabilities provided for by asymmetric keys is not generally available for transmit-only devices.

In order for a transmit-only device to maximise the functionality and security capabilities of asymmetric keys, the transmit-only device must be reconfigured and/or reengineered so as to be capable of receiving communications and to be able to use the appropriate communications protocols. Such reconfiguration/reengineering will increase the cost of the transmit-only device rendering it expensive for certain applications, whilst the negotiations using asymmetric keys may decrease the lifetime of the power source.

FIG. 3 schematically shows communications between IOT device 1 and resource 20 in an example IoT application, whereby the IoT device 1 undertakes a cryptographic operation on the communications before transmission.

In the present example, IoT device 1 is, for example, a constrained device such as a sensor configured to generate operational data based on sensed inputs in its environment. IoT device 1 is further configured to transmit wireless communications comprising the operational data and/or other data (e.g. in packets in the communication). In the present example, the IoT device 1 is not capable of receiving wireless communications from any remote resource, and is therefore configured to function as a transmit-only device.

In the present example, the resource 20 comprises a data processing device configured to receive wireless communications from IoT device 1.

In order to provide a level of security for wireless communications transmitted from the IoT device 1 to the data processing device 20, both the IoT device 1 and the data processing device 20 are, at FIG. 3(i), provisioned with corresponding cryptographic keys. In the present illustrative example, the cryptographic keys are depicted as symmetric keys $S_{KEY}$.

At FIG. 3(ii), during operation, the IoT device 1 uses the cryptographic key $S_{KEY}$ to sign and/or encrypt data in wireless communications transmitted to the data processing device 20. The data processing device 20 receiving the data may verify the signature and/or decrypt the data using the corresponding cryptographic key(s) provided thereon.

Whilst the IoT device 1 may use the cryptographic keys $S_{KEY}$ provisioned thereon to sign/encrypt communications, it will be appreciated that the IoT device 1 is configured as a transmit-only device, and, therefore, remotely modifying, replacing or updating the cryptographic key $S_{KEY}$ is not possible without access to the physical data port 8 thereon.

Furthermore, the cryptographic key may not be updated automatically because the IoT device 1 would not be capable of verifying that the data processing device 20 has been provisioned with the corresponding cryptographic key.

As such, when IoT devices are used in applications where access to the physical data port 8 is restricted or is not financially viable, it may not be possible to the change the cryptographic key(s) on the IoT device 1.

For example, the IoT device 1 may be embedded in a concrete column of a bridge, and configured to measure vibrations of the bridge. Whilst, the IoT device 1 can generate and transmit operational data relating to sensed vibrations, it is not feasible to access the physical data port to change the cryptographic key thereon.

Furthermore, if cryptographic keys on an IoT device cannot be changed, then the data processing device having a corresponding cryptographic key to verify/decrypt data from the IoT device can also not change, unless the corresponding cryptographic key is first re-provisioned on a replacement resource.

Such re-provisioning may not be appropriate for certain applications because, for example, increasing the number of resources which have access to a cryptographic key on an IoT device may permanently impact (e.g. weaken or negate) the level of security the cryptographic keys can provide, as there is a greater chance of a malicious party gaining knowledge of the cryptographic key.

Therefore, a user may not be able to readily change/upgrade/add resources comprising a particular cryptographic key for the duration of the application/project involving the IoT device or for the duration which a user wants to receive data therefrom.

As such, the lifetime of the IoT device with a preprovisioned cryptographic key is limited to the lifetime of its security relationship with the further resource(s) having corresponding cryptographic keys.

Furthermore, it will be appreciated that in cryptographic functions, the key length is an important security parameter, and, as such, when providing keys on a device undertaking cryptographic functions, a user may seek to ensure that such keys are "futureproof," by, for example, providing keys having a relatively large length, to ensure that such cryptographic keys cannot be easily derived by a non-authorised third-party.

If a cryptographic key provided on an IoT device cannot be changed/re-provisioned over the IoT device's lifetime or for the duration of an application/project in which it is used, then a user may choose to maximise the security of the permanently provisioned cryptographic keys by, for example, provisioning cryptographic keys having a relatively long length (e.g. >1000 bits) on the IoT device which may require increased memory capacity. Additionally, or alternatively, the user may provision cryptographic keys derived using relatively secure and complex encryption algorithms (e.g. AES512) which may require a significant investment in power and resources in order to encrypt communications generated thereby. Such lengthy keys or complex algorithms may not be suitable for constrained IoT devices, and may incur unwanted processing and memory expense.

FIGS. 4, 5, 6 and 7 schematically shows communications transmitted from IoT device 1 to a receiving data processing device 20 in an IoT application according to embodiments employing the present techniques.

Like numbering used above will be used as appropriate. The IoT device 1 is configured as a transmit-only device via wireless communications which is not configured to receive wireless communications. However, writing to/reading from memory circuity of the IoT device 1 may be enabled via wired communications e.g. via a physical data port (not shown in FIGS. 4-7).

At FIG. 4(*i*), the IoT device 1 and data processing device 20 are provisioned with corresponding master cryptographic keys $S_{KEY(master)}$. In the present illustrative example, the master cryptographic keys $S_{KEY(master)}$ provisioned on the IoT device 1 and data processing device 20 are depicted as symmetric keys.

In alternative examples, the master cryptographic keys may be asymmetric keys e.g. a public/private key pair whereby the IoT device 1 and data processing device 20 are each provisioned with a respective private key of the public/private key pair. Furthermore, the IoT device 1 may be provisioned with the public key of the data processing device 20, whilst the data processing device 20 is provisioned with the public key of the IoT device 1.

In further examples, the master cryptographic key may be a seed which is used to initialise a number generator (e.g. a pseudorandom number generator) to generate a number.

At FIG. 4(*ii*), the IoT device 1 generates a current session key ($S_{KEY(n)}$).

The current session key may, for example, comprise a pseudorandom number of n-bits e.g. 128 bits, which is generated on the IoT device 1 using a suitable number generator. Additionally, or alternatively, the session key may be a true random number of n-bits, generated on the IoT device 1 using a true random number generator (TRNG). Alternatively, the session key may be selected bits of the master cryptographic key, or selected bits of pseudorandom or true random number sequences.

The IoT device 1 then encrypts the current session key $S_{KEY(n)}$ with $S_{KEY(master)}$ to provide encrypted current session key ($S_{KEY(master)}[S_{KEY(n)}]$), which is subsequently transmitted to the data processing device 20, in one or more packets of a communication, hereinafter 'key-communication'.

On receiving the key-communication, the data processing device 20 then decrypts $S_{KEY(master)}[S_{KEY(n)}]$ using the corresponding master cryptographic key provisioned thereon and derives the current session key $S_{KEY(n)}$.

In some examples, the IoT device 1 may also sign the current session key $S_{KEY(n)}$ or the key-communication with the master cryptographic key (not shown), such that the data processing device can verify that the key-communication originated from the IoT device by verifying the signature using the corresponding master cryptographic key provisioned thereon.

In embodiments, encrypting or signing the current session key $S_{KEY(n)}$ or the key-communication with the master cryptographic key $S_{KEY(master)}$, provides an identifier in the key-communication which enables a resource having the appropriate data thereon to derive the current session key.

At FIG. 4(*iii*), the IoT device 1 generates operational data [DATA], and performs a cryptographic operation on the operational data to provide cryptographic data (crypto-data).

In the present example the cryptographic operation comprises encrypting the operational data using the current session key $S_{KEY(n)}$ to provide crypto-data ($S_{KEY(n)}[DATA]$). The crypto-data is then transmitted to the data processing device 20 in one or more packets of a communication, hereinafter 'crypto-communication'.

In some examples, the IoT device 1 may perform an additional or alternative cryptographic operation on the operational data by signing the operational data and/or the crypto-communication with the current session key, such that the data processing device can verify that the operational data originated from the IoT device. by verifying the signature with the corresponding session key derived thereby.

Such functionality provides a level of integrity for the operational data, in that a receiving device can verify that the operational data originated from an expected source which may be trusted. If not verified, the receiving device may take an appropriate action such as, for example, not decrypting the operational data, or not processing the unverified operational data.

In alternative examples, the IoT device may sign the operational data and/or the crypto-communication with the master cryptographic key which may provide a greater level of integrity in comparison to signing with the current session key. However, signing with the current session key may also be less power/processor intensive in comparison to the signing with the master cryptographic key.

On receiving the crypto-communication, the data processing device 20 decrypts the received data using the derived current session key $S_{KEY(n)}$, and/or may verify any signature thereon.

The IoT device 1 may continue to transmit further crypto-communications having operational data encrypted using the current session key, whilst the data processing device 20 may continue to decrypt such crypto-communications, whilst the current session key is valid.

The IoT device 1 may periodically update the current session key e.g. every hour, day, month or over random periods. Alternatively, the IoT device 1 may update the current session key after a predefined, or random, number of communications. Once an updated current session key is generated by the IoT device 1, any previous session keys may be invalid. Therefore, the IoT device may only grant the processing device 20 with temporary access to the data generated thereon.

For example, as shown at FIG. 4(iv), the IoT device 1 generates a new current session key ($S_{KEY(n+1)}$) and encrypts $S_{KEY(n+1)}$ with $S_{KEY(master)}$ to provide encrypted current session key ($S_{KEY(master)}[S_{KEY(n+1)}]$). As before, the encrypted current session key is transmitted to the data processing device 20. It will be appreciated that, once a new current session key is generated, any previous session key (e.g. $S_{KEY(n)}$) will be invalid.

The data processing device 20 then decrypts $S_{KEY(master)}$ [$S_{KEY(n+1)}$] using the corresponding master cryptographic key provisioned thereon and derives the current session key $S_{KEY(n+1)}$.

At FIG. 4(v), the IoT device 1 generates operational data, and encrypts the operational data using the current session key $S_{KEY(n+1)}$ to provide updated crypto-data ($S_{KEY(n+1)}$ [DATA]), which is transmitted to the data processing device 20.

The data processing device 20 then decrypts the received crypto-data using the derived current session key $S_{KEY(n+1)}$.

The IoT device 1 may continue to transmit crypto-communications having operational data encrypted using the current session key $S_{KEY(n+1)}$, and the data processing device 20 may continue to decrypt the operational data in such communications with the current session key $S_{KEY(n+1)}$ whilst valid.

In some examples, in parallel with transmitting the encrypted data, the IoT device 1 may, via the same communications channel (e.g. at different times or within the same packets of a communication), or via one or more different communications channel, repeatedly re-transmit the encrypted current session key (as depicted by the broken line in FIGS. 4(iii) & 4(v)). Therefore, if a data processing device does not receive all of the packets of a key-communication, the data processing device will have the opportunity to receive all of the key-communication over time, when re-transmitted by the IoT device.

In the illustrative example of FIG. 4, the key-communication and crypto-communication are depicted as being separate communications.

However, the encrypted current session key and crypto-data may be transmitted in the same packets or different packets as part of the same communication, whereby on receiving all packets comprising the encrypted current session key, the data processing device 20 will derive the current session key and may begin to decrypt the data.

Furthermore, in some examples the communications comprising the encrypted current session key may be transmitted from the IoT device with FEC (Forward Error correction), whereby the key-communication may be ordered (e.g. with a packet sequence identifier), such that the data processing device may reconstruct such communications even if all packets are not received from the IoT device.

Examples of FEC may include interleaving, whereby the IoT device interleaves bits of the encrypted current session key across different packets of a key-communication, such that a data processing device receiving the different packets can reconstruct key-communication and derive the current session key. However, any suitable type of FEC may be used.

It will also be appreciated that the crypto-communication may also be transmitted from the IoT device using FEC.

In the following illustrative examples described in FIGS. 5-7, data processing device 20 is in two-way communication with resource 22. In some examples, data processing device 20 and resources 22 may be part of the same entity.

At FIG. 5(i), the IoT device 1 and resource 22 are provisioned with corresponding master cryptographic keys $S_{KEY(master)}$. In the present illustrative example, the master cryptographic keys $S_{KEY(master)}$ provisioned on the IoT device 1 and resource 22 are depicted as symmetric keys.

In the following illustrative examples, the data processing device 20 does not have access to the master cryptographic keys $S_{KEY(master)}$, and as such cannot decrypt/verify communications encrypted/signed therewith.

At FIG. 5(ii), the IoT device 1 generates a current session key ($S_{KEY(n)}$), which may be used to sign or encrypt communications, or data therein.

As before, the current session key may, for example, comprise a pseudorandom number of n-bits, which is generated on the IoT device 1 using a suitable number generator. Additionally, or alternatively, the session key may be a true random number of n-bits, or selected bits of pseudorandom or true random number sequences.

The IoT device 1 then encrypts the current session $S_{KEY(n)}$ with $S_{KEY(master)}$ to provide encrypted current session key ($S_{KEY(master)}[S_{KEY(n)}]$), which is subsequently transmitted to the data processing device 20 in one or more packets of a key-communication.

As above, in some examples, the IoT device may also perform an additional or alternative cryptographic operation on the current session key $S_{KEY(n)}$ or the key communication by signing using the master cryptographic key.

As before, encrypting or signing the current session key $S_{KEY(n)}$ or the key communication with the master cryptographic key $S_{KEY(master)}$, provides an identifier in the key-communication which enables a resource to derive the current session key.

At FIG. 5(ii), as the data processing device 20 is not capable of deriving the current session key, it forwards the encrypted current session key ($S_{KEY(master)}[S_{KEY(n)}]$) to resource 22.

The resource 22 derives the current session key $S_{KEY(n)}$ using the corresponding $S_{KEY(master)}$ provisioned thereon, and transmits the derived current session key $S_{KEY(n)}$ to the data processing device 20. It will be appreciated that as the resource 22 and data processing device 20 are bi- or multi-directional resources, communications therebetween may be secured as appropriate, for example using SSL protocol.

In some examples, the data processing device 20 may be provisioned with the address (e.g. IPv6 address) of the resource 22 e.g. during a registration process between an owner of the data processing device 20 and the resource 22. Alternatively, the key-communication may also comprise an address of the resource 22 (or other resources) from which a current session key may be obtained.

In some examples, before transmitting the current session key to the data processing device 20, the resource 22 may verify that the data processing device 20 is an authorised device e.g. authorised to decrypt communications from the IoT device 1.

For example, before forwarding the encrypted session key to the resource 22, the data processing device 20 may cryptographically sign the encrypted session key (e.g. with a private key thereof). The resource 22 may then verify the cryptographic signature (e.g. with a public key of the data processing device 20 provisioned thereon), to confirm that the data processing device 20 is authorised. If not authorised, the resource 22 may not derive the current session key and/or may not send it to the data processing device 20.

At FIG. 5(iii), the IoT device 1 generates operational data and performs a cryptographic operation thereon to provide crypto-data.

In the present illustrative example, the operational data is encrypted using the current session key $S_{KEY(n)}$ to provide ($S_{KEY(n)}[DATA]$), which is transmitted to the data processing device 20 in one or more packets of a crypto-communication.

The data processing device 20 then decrypts the encrypted operational data using the current session key $S_{KEY(n)}$, received from the resource 22.

In some examples, the IoT device 1 may perform an additional or alternative cryptographic operation on the operational data by signing the crypto-communication and/or the operational data using the current session key, such that the data processing device 20 can verify that the crypto-communication originated from the IoT device 1 by verifying the signature with the corresponding session key derived thereby. If not verified, the data processing device 20 may take an appropriate action. Such functionality provides a level of integrity for the operational data, which could not be provided if the crypto-communication and/or the operational data were signed using the master cryptographic key.

The IoT device 1 may continue to transmit crypto-communications having operational data encrypted using the current session key $S_{KEY(n)}$, whilst the data processing device 20 may continue to decrypt the operational data in such communications using the current session key $S_{KEY(n)}$ whilst valid.

As above, The IoT device 1 may periodically update the current session key e.g. every hour, day, month or over random periods. Alternatively, the IoT device 1 may update the current session key after a predefined, or random, number of communications are transmitted therefrom. Once an updated current session key is generated by the IoT device 1, any previous session keys may be invalid. Therefore, the IoT device 1 may only grant the processing device 20 with temporary access to the data generated thereon.

For example, as shown at FIG. 5(iv), the IoT device 1 generates a new current session key ($S_{KEY(n+1)}$) and encrypts $S_{KEY(n+1)}$ with $S_{KEY(master)}$ to provide encrypted current session key $S_{KEY(master)}[S_{KEY(n+1)}]$, which is subsequently transmitted to the data processing device 20.

As before, the data processing device 20 then forwards the encrypted current session key to the resource 22, which derives the current session key (e.g. after verifying the authorisation status of the data processing device), and transmits the derived current session key to the data processing device.

At FIG. 5(v), the IoT device 1 generates operational data, and encrypts the operational data using the current session key $S_{KEY(n+1)}$ to provide updated crypto-data ($S_{KEY(n+1)}[DATA]$), which is transmitted to the data processing device 20.

The data processing device 20 then decrypts the received encrypted data using the current session key $S_{KEY(n+1)}$ received from the resource 22.

The IoT device 1 may continue to transmit crypto-communications having operational data encrypted using the current session key $S_{KEY(n+1)}$, whilst the data processing device 20 may continue to decrypt the operational data in such communications using the current session key $S_{KEY(n+1)}$ whilst valid.

In some examples, in parallel with transmitting the encrypted data, the IoT device 1 may, via the same or different communications channels repeatedly re-transmit the encrypted session key, as depicted by the broken line in FIGS. 5(iii) and 5(v).

Therefore, if the data processing device 20 or resource 22 does not receive all of the packets of a key-communication comprising the encrypted session key, the data processing device 20 will have the opportunity to receive all of the key-communication when re-transmitted by the IoT device 1 and to forward it to the resource 22 for derivation of the current session key thereby.

In the illustrative example of FIG. 5, the key-communication and crypto-communication are depicted as being separate communications. However, as before, the encrypted current session key and crypto-data may be transmitted in the same packets or different packets as part of the same communication.

On receiving communications comprising the encrypted session key and encrypted data, the data processing device 20 may forward the communications to the resource 22, which may derive the current session key using the corresponding master cryptographic key provisioned thereon. The resource 22 can then forward the current session key to the data processing device 20 to decrypt data as described above or the resource may decrypt the operational data and forward it to the data processing device.

At FIG. 6(i), the IoT device 1 and resource 22 are provisioned with corresponding master cryptographic keys. In the present example the master cryptographic keys are depicted as asymmetric key pairs whereby the IoT device 1 and resource 22 are each provisioned with respective private keys of an asymmetric public/private key pair.

In the present illustrative example, IoT device 1 is provisioned with a private key ($PriKey_{(IOT)}$) thereof, whilst the resource 22 is provisioned with a different private key ($PriKey_{(RESOURCE)}$) thereof.

Furthermore, the IoT device 1 is provisioned with the public key of the resource ($PubKey_{(RESOURCE)}$), whilst the resource 22 is provisioned with the public key of the IoT device 1 ($PubKey_{(IOT)}$). Such provisioning may be undertaken at, for example, manufacture or deployment of the IoT device 1.

In the following examples, the data processing device 20 does not have access to the private keys of either the IoT device 1 or the resource 22, and therefore cannot decrypt communications encrypted using the public keys thereof. However, the data processing device may comprise the public keys of the IoT device 1 and/or the resource 22.

At FIG. 6(ii), the IoT device 1 generates a current session key ($S_{KEY(n)}$), which may be used to sign or encrypt communications, or data therein.

As before, the current session key may, for example, comprise a pseudorandom number of n-bits, which is generated on the IoT device 1 using a suitable number generator. Additionally, or alternatively, the session key may be a true random number (TRNG) of n-bits, or selected bits of pseudorandom or true random number sequences.

The IoT device 1 then encrypts $S_{KEY(n)}$ with an appropriate master cryptographic key, which in the present illustrative example is ($PubKey_{(RESOURCE)}$), to provide encrypted current session key ($PubKey_{(RESOURCE)}[S_{KEY(n)}]$), which is subsequently transmitted to the data processing device 20 in one or more packets of a key-communication.

As above, in some examples, the IoT device may also perform an additional or alternative cryptographic operation on the current session key or key communication by signing with an appropriate master cryptographic key, which in the present example is the private key ($PriKey_{(IOT)}$) thereof.

As above, signing the current session key $S_{KEY(n)}$ or the key communication with the appropriate master cryptographic key provides an identifier in the key-communication which enables a resource to derive the current session key.

At FIG. 6(ii), as the data processing device 20 cannot derive the current session key, it forwards the encrypted current session key ($PubKey_{(RESOURCE)} [S_{KEY(n)}]$) to the resource 22, which derives the current session key $S_{KEY(n)}$ using the corresponding private key ($PriKey_{(RESOURCE)}$) provisioned thereon.

The resource 22 then transmits the derived current session key $S_{KEY(n)}$ to the data processing device 20. As above, it will be appreciated that the communications between the data processing device 20 and the resource 22 may be further secured as appropriate, for example using SSL protocol.

As above, the data processing device 20 may be provisioned with the address (e.g. IPv6 address) of the resource 22 e.g. during a registration process between an owner of the data processing device 20 and the resource 22. Alternatively, the key-communication may also comprise an address of the resource 22 (or other resources) from which a current session key may be obtained.

In some examples, before transmitting the current session key to the data processing device 20, the resource 22 may verify that the data processing device 20 is an authorised device e.g. authorised to decrypt communications from the IoT device 1.

For example, before forwarding the encrypted session key to the resource 22, the data processing device 20 may cryptographically sign the encrypted session key (e.g. with the private key thereof). The resource 22 may then verify the cryptographic signature (e.g. with a corresponding public key provisioned thereon), to confirm that the data processing device 20 is authorised. If not authorised, the resource may not derive the current session key and/or may not send it to the data processing device 20.

At FIG. 6(iii), the IoT device 1 generates operational data and performs a cryptographic operation thereon to provide crypto-data.

In the present illustrative example, the operational data is encrypted using the current session key $S_{KEY(n)}$ to provide ($S_{KEY(n)}[DATA]$), which is transmitted to the data processing device 20 in one or more packets of a crypto-communication.

The data processing device 20 then decrypts the encrypted data using the current session key $S_{KEY(n)}$, received from the resource 22.

In some examples, the IoT device 1 may perform an additional or alternative cryptographic operation on the operational data by signing the crypto-communication and/or the operational data with the current session key, such that the data processing device 20 can verify that the crypto-communication originated from the IoT device 1 by verifying the signature with the corresponding current session key derived thereby. If not verified, the data processing device 20 may take an appropriate action. Such functionality provides a level of integrity for the operational data, which could not be provided if signed using the IoT device's private key.

The IoT device 1 may continue to transmit crypto-communications having operational data encrypted using the current session key $S_{KEY(n)}$, whilst the data processing device 20 may decrypt such communications using the current session $S_{KEY(n)}$, whilst still valid.

As above, The IoT device 1 may periodically update the current session key e.g. every hour, day, month or over random periods. Alternatively, the IoT device 1 may change the current session key after a predefined, or random, number of communications are transmitted therefrom. Once an updated current session key is generated by the IoT device 1, any previous session keys will be invalid. Therefore, the IoT device 1 may only grant the processing device 20 with temporary access to the data generated thereon.

For example, as shown at FIG. 6(iv), the IoT device 1 generates a new current session key ($S_{KEY(n+1)}$) and encrypts $S_{KEY(n+1)}$ to provide encrypted current session key ($PubKey_{(RESOURCE)} [S_{KEY(n+1)}]$), which is subsequently transmitted to the data processing device 20.

As before, the data processing device 20 then forwards the encrypted current session key to the resource 22, which derives the current session key (e.g. after verifying the authorisation status of the data processing device), and transmits the derived current session key to the data processing device.

At FIG. 6(v), the IoT device 1 generates operational data, and encrypts the operational data using the current session key $S_{KEY(n+1)}$ to provide encrypted ($S_{KEY(n+1)}[DATA]$), which is transmitted in a communication to the data processing device 20.

The data processing device 20 then decrypts the received encrypted data using the current session key $S_{KEY(n+1)}$ received from the resource 22.

The IoT device 1 may continue to transmit crypto-communications having operational data encrypted using the current session key $S_{KEY(n+1)}$, whilst the data processing device 20 may continue to decrypt the operational data in such communications using the current session key $S_{KEY(n+1)}$, whilst valid.

In some examples, in parallel with transmitting the encrypted data, the IoT device 1 may, via the same or different communications channels repeatedly re-transmit the encrypted session key, as depicted by the broken line in FIGS. 6(*iii*) and 6(*v*).

Therefore, if the data processing device 20 or resource 22 does not receive all of the packets of the key-communication comprising the encrypted session key, the data processing device 20 will have the opportunity to receive all of the key-communication when re-transmitted by the IoT device 1 and to forward it to the resource 22 for derivation of the current session key thereby.

In the illustrative example of FIG. 6, the key-communication and crypto-communication are depicted as being separate communications. However, as before, the encrypted current session key and crypto-data may be transmitted in the same packets or different packets as part of the same communication.

On receiving communications comprising the encrypted session key and the encrypted data the data processing device 20 may forward the communications to the resource 22, which may derive the current session key using the corresponding private key (PriKey$_{(RESOURCE)}$). The resource 22 can then forward the current session key to the data processing device 20 to decrypt data as described above or the resource may decrypt the operational data and forward it to the data processing device.

At FIG. 7(*i*), the IoT device 1 and resource 22 are provisioned with corresponding master cryptographic keys, which, in the present illustrative are depicted as corresponding seeds, and in particular, corresponding pseudo-random sequence (PRS) seeds.

Using matching pseudo-random number algorithms, the IoT device 1 and resource 22 can generate identical pseudo-random number sequences, from which session keys ($S_{KEY}$) can be derived e.g. as selected bits of such pseudo-random number sequences. As above, the session keys may then be used by the IoT device 1 to sign and/or encrypt communications, or data therein.

In some examples, the PRS seed may be a counter/time value. In such cases, the IoT device 1 and the resource 22 may also have synchronised counters/time value generators. For time value generators, the IoT device 1 and the resource 22 may have a synchronised time base such as a UNIX clock, and may use a low frequency radio time signal to maintain synchronicity.

In the following examples, the data processing device 20 does not have access to the PRS seed, and therefore cannot derive the session keys.

At FIG. 7(*ii*), the IoT device 1 derives a current session key ($S_{KEY(n)}$) from a pseudo-random number sequence generated thereon.

The IoT device 1 also generates operational data and performs a cryptographic operation thereon to provide crypto-data. In the present illustrative example, the operational data is encrypted using the current session key $S_{KEY(n)}$ to provide crypto-data ($S_{KEY(n)}$[DATA]).

The crypto-data is transmitted to the data processing device 20 in one or more packets of a communication, hereinafter crypto-communication.

An identifier which enables a resource to derive the current session key is also included in the crypto-communication. In the present example, the identifier is depicted as a sequence number (SEQ #$_{(n)}$) which identifies the selected bits of the pseudo-random number sequence used to provide the current session key. In alternative examples, where the PRS seed is a time value, the identifier may include a timestamp to identify the time at which the pseudo-random number sequence was generated.

In the present illustrative example, the IoT device 1 concatenates the identifier to the crypto-data to provide (SEQ #$_{(n)}$, $S_{KEY(n)}$[DATA]).

Whilst the identifier is depicted as being included in the crypto-communication, it will be appreciated that the identifier may be transmitted to the data processing device 20 in a separate key-communication.

At FIG. 7(*ii*) as the data processing device 20 is not capable of deriving the current session key, it forwards the communication having the identifier (SEQ #$_{(n)}$) to the resource 22, which derives the current session key $S_{KEY(n)}$ using the received identifier, the PRS seed provisioned thereon and the matching pseudo-random number algorithm.

The resource 22 then transmits the current session key $S_{KEY(n)}$ to the data processing device 20. As above, the communications between the data processing device 20 and the resource 22 may be further secured as appropriate, for example using SSL protocol.

As above, the data processing device 20 may be provisioned with the address (e.g. IPv6 address) of the resource 22 e.g. during a registration process between an owner of the data processing device 20 and the resource 22. Alternatively, the crypto-communication may also comprise an address of the resource 22 (or other resources) from which a current session key may be derived.

As above, before transmitting the current session key to the data processing device 20, the resource 22 may verify that the data processing device 20 is an authorised device e.g. authorised to decrypt communications from the IoT device 1.

For example, before forwarding the session key to the resource 22, the data processing device 20 may cryptographically sign the encrypted session key (e.g. with the private key thereof). The resource 22 may then verify the cryptographic signature (e.g. with the corresponding public key provisioned thereon), to confirm that the data processing device 20 is authorised. If not authorised, the resource may not derive the current session key and/or may not send it to the data processing device 20.

Furthermore, in some examples, the IoT device 1 may also sign the crypto-communication comprising the identifier and encrypted data, such that the resource 22 can verify that the crypto-communication originated from the IoT device 1. If not verified, the resource 22 may not derive the current session key or the data processing device 20 may not forward the identifier to the resource 22.

As illustratively shown at 7(*iii*), the IoT device 1 may continue to transmit communications having operational data encrypted using the current session key $S_{KEY(n)}$, whilst the data processing device 20 may decrypt communications having data encrypted using the current session $S_{KEY(n)}$.

In some examples, the IoT device 1 may perform an additional or alternative cryptographic operation on the operational data by signing the crypto-communication/and or operational data using the current session key, such that the data processing device 20 can verify that the operational data originated from the IoT device by verifying the signature with the corresponding session key derived thereby. Such functionality provides a level of integrity for the operational data.

As above, The IoT device 1 may periodically update the current session key e.g. every hour, day, month or over random periods. Alternatively, the IoT device 1 may update the current session key after a predefined, or random, number of communications are transmitted therefrom. Once an updated current session key is generated by the IoT device 1, any previous session keys will be invalid. Therefore, the IoT device 1 may only grant the processing device 20 with temporary access to the data generated thereon.

For example, as shown at FIG. 7(iv), the IoT device 1 generates a new current session key ($S_{KEY(n+1)}$) and encrypts data with the current session key to provide a crypto-communication with the encrypted operational data and an identifier (SEQ #$_{(n+1)}$).

The data processing device 20 then forwards the identifier (SEQ #$_{(n+1)}$) to the resource 22, which derives the current session key $S_{KEY(n+1)}$, and transmits the derived current session key $S_{KEY(n+1)}$ to the data processing device 20 (e.g. after verifying the authorisation status of the data processing device).

The data processing device 20 then decrypts the received encrypted operational data using the current session key $S_{KEY(n+1)}$ received from the resource 22.

The IoT device 1 may continue to transmit communications encrypted using the current session key, whilst the data processing device 20 may continue to decrypt communications encrypted using the current session key, whilst valid.

As above, the IoT device 1 may continue to periodically update the session key. Once an updated current session key is generated by the IoT device 1, any previous session key may be invalid. The IoT device may then transmit a communication with an identifier for the updated current session key as previously described.

As above, in some examples, the IoT device 1 may, via the same or different communications channels repeatedly re-transmit the identifier, as depicted by the broken line in FIG. 7(iii) such that if the data processing device 20 or resource 22 does not receive all of the identifier in the crypto-communication, the data processing device 20 will have the opportunity to receive all of the identifier when re-transmitted by the IoT device 1 and to forward it to the resource 22 for derivation of the current session key thereby.

In the illustrative examples of FIGS. 5 to 7 above, the data processing devices do not have access to the master cryptographic keys required to decrypt the current session keys, and, therefore, may only receive the appropriate current session keys from a resource remote therefrom.

Furthermore, as the IoT devices do not have a relationship with the data processing devices receiving communications therefrom in a system/network, the data processing devices can be modified/replaced without having to update the IoT device because any modified/new data processing devices will receive the required session keys separately from a resource with which it has a relationship.

There is also no requirement to access the IoT device to provision master cryptographic keys thereon when a data processing device is modified/replaced.

Such functionality means that it is possible to scale up the number of such data processing devices receiving communications from the IoT device.

Furthermore, any such modified/new data processing devices in the system/network will not be capable of decrypting previously transmitted communications without a valid session key. Therefore, the present techniques provide forward secrecy and enable changes in ownership whilst maintaining confidentiality of data which may be owned by previous owners.

It will also be understood that communications (e.g. key-, crypto-communications) may be transmitted from the IoT device with FEC.

It will also be understood that whilst the illustrative examples in FIGS. 4 to 7 above depict one IoT device in one-way wireless communications with one data processing device, it will be appreciated that two or more IoT devices may be arranged in one-way wireless communications with two or more data processing devices.

In further examples, the session keys may be structured as multiple-stage session keys, hereinafter "structured session keys," whereby each structured session key is directly derivable from a parent key, and whereby the parent keys are derivable, directly or indirectly, from a single master cryptographic key.

Such structured session keys enable the decryption of different data in one or more communications transmitted from an IoT device by different receiving devices, and whereby the structured session keys may have different validity periods from one another.

As an illustrative example, FIG. 8 schematically shows an example of structured session keys derived from a master cryptographic key 30 provisioned on the IoT device 1.

The master cryptographic key 30 may take any suitable form as described above. For example, the master cryptographic key may be a symmetric key, an asymmetric key pair, or a seed. The master cryptographic keys 30 may be provisioned on the IoT device 1 at manufacture, or deployment, thereof.

In an illustrative example, the IoT device 1 generates a first structured session key $S_{KEY(1)}$ directly derived from the master cryptographic key, e.g. by taking selected bits of the master cryptographic key 30 as $S_{KEY(1)}$. Therefore, in the present example, the master cryptographic key is the parent of $S_{KEY(1)}$, whilst $S_{KEY(1)}$ is the child of the master cryptographic key.

The IoT device 1 then generates second $S_{KEY(2)}$ and third $S_{KEY(3)}$ structured session keys derived from the first structured session key $S_{KEY(1)}$, e.g. by taking selected bits of $S_{KEY(1)}$ as $S_{KEY(2)}$, and taking different selected bits of $S_{KEY(1)}$ as $S_{KEY(3)}$. Therefore, in the present example, $S_{KEY(1)}$ is the parent of $S_{KEY(2)}$ and $S_{KEY(3)}$, whilst $S_{KEY(2)}$ and $S_{KEY(3)}$ are each the child of $S_{KEY(1)}$, and directly derivable therefrom, whilst both $S_{KEY(2)}$ and $S_{KEY(3)}$ are indirectly derivable from the master cryptographic key.

The IoT device 1 generates fourth $S_{KEY(4)}$ and fifth $S_{KEY(5)}$ structured session keys derived from the second structured session key $S_{KEY(2)}$ (by taking selected bits of $S_{KEY(2)}$ for the respective keys), and generates sixth $S_{KEY(6)}$ and seventh $S_{KEY(7)}$ structured session keys derived from the third structured session key $S_{KEY(3)}$ (by taking selected bits of $S_{KEY(3)}$ for the respective keys). Therefore, in the present example, $S_{KEY(2)}$ is the parent of $S_{KEY(4)}$ and $S_{KEY(5)}$, whilst $S_{KEY(4)}$ and $S_{KEY(5)}$ are each the child of $S_{KEY(2)}$, and directly derivable therefrom, whilst both $S_{KEY(4)}$ and $S_{KEY(5)}$ are indirectly derivable from the master cryptographic key and $S_{KEY(1)}$.

Furthermore, $S_{KEY(3)}$ is the parent of $S_{KEY(6)}$ and $S_{KEY(7)}$, whilst $S_{KEY(6)}$ and $S_{KEY(7)}$ are each the child of $S_{KEY(3)}$, and directly derivable therefrom, whilst both $S_{KEY(6)}$ and $S_{KEY(7)}$ are indirectly derivable from the master cryptographic key and $S_{KEY(1)}$.

The IoT device 1 may then encrypt data with the respective structured session keys $S_{KEY(4)}$ to $S_{KEY(7)}$.

For example, in the present illustrative example, packets 32a and 32b are encrypted using the fourth structured session key $S_{KEY(4)}$; packets 32c and 32d are encrypted using the fifth structured session key $S_{KEY(5)}$; packets 32e and 32f are encrypted using the sixth structured session key $S_{KEY(6)}$ and packets 32g and 32h are encrypted using the seventh structured session key $S_{KEY(7)}$ and transmitted to one or more resources via wireless communication e.g. a broadcast communication.

A resource in wireless communication range of the IoT device 1 and receiving the encrypted packets 32a-32h therefrom will require a corresponding key to decrypt the packets 32a-32h.

In the illustrative example of FIG. 8, resources 20a-20n, comprise data processing devices, hereinafter "receiving devices" configured to receive communications from the IoT device 1.

In some examples, the receiving devices 20a-20n, may be provisioned with one or more of the structured session keys $S_{KEY(1)}$ to $S_{KEY(7)}$ e.g. on manufacture or from another resource remote therefrom. The packets which a particular receiving device 20a-20n can decrypt will depend on which of the structured session keys the particular receiving device is provisioned with.

As an illustrative example, receiving device 20a is provisioned with structured session key $S_{KEY(1)}$ and receives packets 32a-32h encrypted using structured session keys $S_{KEY(4)}$ to $S_{KEY(7)}$ as previously described.

As the receiving device 20a is provisioned with $S_{KEY(1)}$, the receiving device 20a can generate structured session keys $S_{KEY(2)}$ and $S_{KEY(3)}$ directly derived from parent $S_{KEY(1)}$. The receiving device 20a can then generate structured session keys $S_{KEY(4)}$ to $S_{KEY(7)}$, directly derived from respective parent keys of $S_{KEY(2)}$ and $S_{KEY(3)}$. The receiving device 20a can then decrypt all packets using the corresponding structured session keys.

In some examples, the receiving devices may receive an identifier to identify how a particular structured session key is to be derived from a parent e.g. the selected bits of the parent.

In the present illustrative example, receiving device 20b is provisioned with structured session key $S_{KEY(4)}$ and receives packets 32a-32h encrypted using structured session keys $S_{KEY(4)}$ to $S_{KEY(7)}$ as previously described.

Therefore, the receiving device 20b can decrypt packets 32a and 32b, which were encrypted by the IoT device 1 using the corresponding structured session key $S_{KEY(4)}$. However, the receiving device 20b cannot decrypt any of the other received packets 32c-32h.

In the present illustrative example, receiving device 20c is not provisioned with any structured session keys and receives packets 32a-32h encrypted using structured session keys $S_{KEY(4)}$ to $S_{KEY(7)}$. As the receiving device 20c is not provisioned with any structured session keys, the receiving device 20c cannot decrypt any of the packets 32a to 32h.

In the present illustrative example, receiving device 20(n−2) is provisioned with structured session key $S_{KEY(3)}$ and receives packets 32a-32h encrypted using structured session keys $S_{KEY(4)}$ to $S_{KEY(7)}$. Therefore, the receiving device 20(n−2) can generate structured session keys $S_{KEY(6)}$ and $S_{KEY(7)}$ derived from the parent $S_{KEY(3)}$. The receiving device 20(n−2) can then decrypt packets 32e to 32h, which were encrypted by the IoT device 1 using the corresponding structured session keys $S_{KEY(6)}$ and $S_{KEY(7)}$ respectively.

In the present illustrative example, receiving device 20(n−1) is provisioned with structured session key $S_{KEY(7)}$ and receives packets 32a-32h encrypted using structured session keys $S_{KEY(4)}$ to $S_{KEY(7)}$. Therefore, the receiving device 20(n−1) can decrypt packets 32g and 32h, which were encrypted by the IoT device 1 using the corresponding structured session key $S_{KEY(7)}$.

It will also be appreciated that the receiving devices 20-20n may be provisioned with more than one structured session key. In the present illustrative example, receiving device 20(n) is provisioned with two structured session keys $S_{KEY(2)}$ and $S_{KEY(6)}$.

As the receiving device 20n is provisioned with $S_{KEY(2)}$, the receiving device 20n can generate structured session keys $S_{KEY(4)}$ and $S_{KEY(5)}$ directly derived from the parent $S_{KEY(2)}$. The receiving device 20n can then decrypt packets 32a to 32d, which were encrypted by the IoT device 1 using the corresponding structured session keys $S_{KEY(4)}$ and $S_{KEY(5)}$ respectively. The receiving device 20n can also decrypt packets 32e and 32f which were encrypted by the IoT device 1 using the corresponding structured session key $S_{KEY(6)}$. However, the receiving device 20n cannot decrypt any of the other received packets 32g or 32h as receiving device 20n is not provisioned with structured session keys $S_{KEY(1)}$, $S_{KEY(3)}$ or $S_{KEY(7)}$.

Furthermore, whilst the receiving devices 20a-20n may be provisioned with one or more structured session keys (for example at deployment, or at manufacture), in some examples the receiving devices 20a-20n may receive/be provisioned with structured session keys from a resource 22 in communication therewith.

As above, all of the receiving devices 20a-20n may be in bi-directional communication with resource 22 (although only communications between resource 22 and receiving devices 20a-20c are depicted in FIG. 8).

The resource 22 is also provisioned with the master cryptographic key 30, and is capable of generating structured session keys as generated by the IoT device 1.

As described above, receiving device 20c is not provisioned with any structured session keys, and, therefore, cannot decrypt the packets 32a-32h.

However, receiving device 20c may request a structured session key from resource 22. The request may also comprise identifiers received from the IoT device to identify how the respective structured session keys are derived from a particular parent key.

Additionally, or alternatively, the request may comprise a request to access specific data/packets received from the IoT device 1.

Before transmitting a structured session key to the receiving device 20c, the resource 22 may verify that the receiving device 20c is an authorised device e.g. authorised to decrypt communications from the IoT device 1, or which packets the receiving device 20c is authorised to access.

For example, before transmitting a request to the resource 22, the receiving device 20 may cryptographically sign the request (e.g. with a private key thereof). The resource 22 may then verify the cryptographic signature (e.g. with a public key of the receiving device 20c provisioned thereon), to confirm that the receiving device 20 is authorised. If not authorised, the resource 22 may not provide the appropriate structured session key.

The resource 22 may provide an appropriate structured session key depending on the specific authorisation status of the receiving device 20c. For example, if the receiving device from which it received the request is only authorised to access packets 32a and 32b, the resource 22 may only provide receiving device 20c with structured session key $S_{KEY(4)}$.

Alternatively, if the receiving device 20c is only authorised to access packets 32a to 32d, the resource 22 may provide receiving device 20c with structured session key $S_{KEY(2)}$, from which the receiving device 20 could derive structured session keys $S_{KEY(4)}$ & $S_{KEY(5)}$. Alternatively, the resource may simply provide receiving device 20c with the structured session keys $S_{KEY(4)}$ & $S_{KEY(5)}$, such that the receiving device 20c does not have to undertake any derivation.

It will be seen that one or more of the receiving devices 20a-20n may communicate with the resource 22 to request keys therefrom.

The IoT device 1 may periodically change the structured session key $S_{KEY(1)}$ e.g. every hour, day, month or over random periods. As such, any child keys derived therefrom will also change. As such the receiving devices 20a-20n will only be able to decrypt data in received packets whilst having access to the corresponding structured session keys. Therefore, the receiving devices 20a-20n may only be able to decrypt data temporarily whilst the respective child keys are valid.

When a structured session key becomes invalid (e.g. when $S_{KEY(1)}$ is updated), the receiving devices 20a-20n may request a valid structured session key from the resource 22.

In examples, the resource 22 may receive communications comprising data from the IoT device 1 either directly e.g. via a broadcast from the IoT device 1, or indirectly via the receiving devices 20-20n. Therefore, instead of merely deriving appropriate keys for one or more of the receiving devices 20a-20n and providing the derived keys thereto, the resource 22 may derive the session keys, decrypt the data and forward it to a receiving device whilst authorised. Such communications between the resource 22 and the receiving devices 20a-20n may be undertaken via SSL and may provide increased security for the structured keys as they remain at the resource and are not transmitted to the receiving devices.

Deriving the structured keys and decrypting the data at the resource 22 may also reduce the processing burden at the receiving devices 20a-20n, as the resource 22 will decrypt the data thereon and transmit the data directly to an authorised receiving device. Such functionality may also negate the requirement of the receiving devices to decrypt/authorise the communications from the IoT device.

The resource 22 may also verify the authorisation status of the IoT device 1 if the IoT device has signed the communication encrypted with the structured session keys, and only decrypt data from an authorised IoT device.

FIG. 9a schematically shows an example method of an IoT device generating and transmitting data encrypted using a current session key to one or more resources; and FIG. 9b schematically shows an example method of a resource obtaining a current session key to decrypt data received from the IoT device, the data being encrypted using a current session key.

At Step 100, the method of FIG. 9a starts.

At Step 102, the IoT device is provisioned with a master cryptographic key, which may comprise a symmetric cryptographic key, an asymmetric cryptographic key, a seed (e.g. a PRS seed) or any suitable key.

At Step 104, the IoT device generates a current session key which is derived from the master cryptographic key. In some cases the IoT device generates a plurality of structured session keys.

At Step 106, the IoT device generates a communication comprising an identifier which enables a resource to derive the current session key. As described previously, such an identifier may comprise the current session key when encrypted with the master cryptographic key.

In alternative examples, the identifier may be a sequence number which identifies the selected bits of the pseudo-random number sequence used to provide the current session key or a timestamp to identify the time at which the pseudo-random number sequence was generated.

At step 108, the IoT device generates operational data thereon. Such operational data may, for example, comprise data based on sensed inputs from the IoT device's environment.

At step 110, the IoT device encrypts the operational data with the current session key. The operational data may be provided in multiple packets. In some examples, different packets may be encrypted using different structured session keys.

At Step 112, the IoT device transmits the encrypted data. Such transmissions may be broadcast transmissions such that any resource within wireless communication range of the IoT device may receive the transmissions.

At Step 114, the IoT device may update the current session key. A trigger for changing the current session key may be after a certain period of time elapses (e.g. an hour, a day, a week, a month), or after a certain amount of packets are transmitted from the IoT device. Alternatively, the IoT device may randomly change the current session key after random periods of time/packets transmitted.

If the current session key is changed, then the IoT device will generate a new current session key as at step 104.

If the current session key is not changed, then the IoT device will continue to encrypt operational data with the current session key as at step 110.

At step 116, the method of FIG. 9a ends.

At Step 120, the method of FIG. 9b starts.

At Step 122, the resource receives a communication comprising the current session key encrypted using the master cryptographic key, whereby a corresponding master cryptographic key is provisioned on the resource. Such a communication may be considered to be an identifier to enable the resource to generate the current session key.

At step 124, the resource receives operational data encrypted using a current session key.

In alternative examples, the resource may receive a communication comprising operational data encrypted using the current session key, and a further identifier, such as a sequence number or timestamp.

At step 126, the resource may determine if it has the appropriate current session key required to decrypt the data.

If the resource determines that it does not have the appropriate session key to decrypt the data, then it may, at Step 130 request the current session key from a further resource, such as a web service with which it is registered/subscribed. If the request is successful, at Step 132, the resource receives the current session key from the further resource.

Alternatively, at step 134, the resource may derive the session key if it has the appropriate data provisioned thereon (e.g. master cryptographic key).

When the resource, receives or derives the current session key the resource may at Step 136 decrypt the data encrypted using the current session key and/or verify an authorisation status of the source of the data.

Furthermore, at Step 128, if the resource determines that it does have the appropriate session key to decrypt the data, the resource may at Step 136 decrypt the data encrypted using the current session key.

The resource may continue to receive communications from the IoT device, and data encrypted using the current session key as at steps 122 and 124.

At Step 138, the method of FIG. 9b ends.

From the examples set out above, it will be appreciated that the master cryptographic keys provided on the transmit-only device may be longer and more secure than the session keys generated thereby.

Furthermore, the master cryptographic key may be provisioned in software whilst the session keys may be generated in hardware. For example, the transmit-only device may support generating AES128 in hardware, whilst the master cryptographic key may be, for example, AES256 in software. Therefore, using the present techniques, it's possible to use higher order encryption in software which may prolong the lifetime of the internal hardware encryption of the transmit-only device.

Furthermore, the rolling (periodically changing/updating) session keys may provide increased security in comparison to, for example, non-rolling session keys. For example, the impact of side channel attacks may be reduced in that whilst an attacker may garner information about the cryptographic key from a transmission by the transmit-only device, the rolling session keys means that the current session key may change before being derived by an attacker (e.g. by brute force), or, if derived by an attacker, will only be valid temporarily until an updated session key is generated. Therefore, successful side channel attacks may be more difficult to execute with rolling session keys.

Furthermore, if the transmit-only device determines that a session key has been compromised (e.g. via tamper detection sensors), then it can generate an updated session key.

Furthermore still, using the techniques described above, whilst the master cryptographic key on the transmit-only device may not be changed over the lifetime of the device (without physical access thereto), the level of security of the encryption/signing process is improved in comparison to known techniques using, for example symmetric keys, in that session keys derived from the master cryptographic key are changed periodically, and can only be derived by an authorised party, thereby making it increasingly difficult for an attacker to derive the session keys.

As the session keys are generated by transmit-only devices, there is no requirement for the transmit-only devices to negotiate the session keys with any other resource, as required in well standardised security protocols (e.g. SSL).

Therefore, constrained devices, such as constrained "edge" devices which do not have full internet protocol capability, or which lack energy or software to participate in internet security protocols, may use the techniques herein described. Such devices may include energy harvesting devices or sensors on ultra-low power wireless links, when, for example, participating in IP-based control and sensing systems which would benefit from having a consistent set of security guarantees from all participating devices, whereby the security guarantees provide confidence in the integrity, authenticity and freshness of received messages, and in some cases, which require forward secrecy and confidentiality.

Using the present techniques described above, a resource receiving data from the transmit-only device only gains access to data encrypted using a current session key for the duration that resource has access to a valid current session key. Therefore, the transmit-only device may only grant the resource with temporary access to the data generated thereon.

As such, a resource which receives communications having data encrypted using a session key to which the resource has access can decrypt that data, but cannot decrypt data in future communications encrypted using an updated session key if the resource does not have access to the updated session key. Such secrecy functionality allows for the ownership of such resources to be changed.

Furthermore, a resource which receives communications having data encrypted using a session key to which the resource has access can decrypt that data, but cannot decrypt data in past communications encrypted using a previous session key if the resource does not have access to the previous session key. Such functionality provides forward secrecy and also allows for ownership of such resources to be changed.

In the examples described in FIGS. 5 to 9b above, the resource which provides current session keys to the data processing device(s) is taken to be a trusted resource.

A trusted resource negates the requirement to pre-provision cryptographic keys on the data processing devices at manufacture or deployment of the transmit-only device, as any such cryptographic keys can be provisioned thereon subsequently whereby the trusted resource may first determine the authorisation status of the data processing devices using any suitable method (e.g. using a suitable negotiation protocol and/or verifying a cryptographic signature etc.) before transmitting the a session key thereto.

The trusted resource also provides security in that data processing devices receiving messages from the transmit-only devices cannot derive past, current or future session keys unless provisioned with the appropriate cryptographic keys by the trusted resource.

The trusted resource may have relationships with a plurality of data processing devices and/or transmit-only device(s), and the trusted resource may comprise, or be in communication with a registry service, to verify the authorisation status of the data processing device(s) and/or transmit-only device(s).

Such a trusted resource may track the ownership of each data processing device by requiring the explicit assignment of "data rights" by any previous owner e.g. on sale/lease of a device, whereby the transfer is registered at the registry service.

Such a trusted resource may guarantee that it will not provide the previous owner with any further session keys for communications from a particular transmit-only device, thereby providing secrecy for any new communications received at data processing devices owned by the previous owner.

Therefore, the trusted resource may act as a trusted third party handling transfer of security relationships between different owners of data processing devices.

If the ownership of one or more of the data processing devices is updated such that a new owner takes ownership/leases one or more of the data processing devices, the trusted resource may provision appropriate session keys to the one or more data processing devices.

As above, the session keys provisioned to the one or more data processing device will provide secrecy for past and future session keys, and may also provide access to different data for different owners.

Therefore, ownership of data processing devices/transmit only devices can be readily updated whilst maintaining secrecy.

Additionally, or alternatively, the trusted resource may be a web service which provides valid session keys to authorised data processing devices. Such a web service may be subscription based, whereby owners of a data processing device subscribe to/register with the web service, and on the basis of a successful registration or subscription receive a valid current session key from the web service to decrypt the data received from one or more transmit-only devices.

In some examples, the web service may not comprise sufficient information to verify the authorisation status of a particular data processing device. However, the web service may be in communication with a further resource (e.g. a registry service) with which it can verify whether a particular data processing device is valid or not by, for example, verifying a signature of the particular data processing device with the further resource.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

Alternatively, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

As will be appreciated from the foregoing specification, techniques are described providing a method of securing wireless communications from a transmit-only device, which may be transmitted from an IoT device to one or more mutually untrusted/unknown relying parties.

In embodiments, the first current session key may be derived from a master cryptographic key provisioned on the transmit-only device, wherein the master cryptographic key may comprise one of: a symmetric key, an asymmetric key and a seed.

The cryptographic operation may comprise one of: encrypting the operational data with the first current session key and signing the operational data with the first current session key and wherein the first identifier may comprise one of: a cryptographic key (e.g. encrypted or signed cryptographic key), a sequence of bits and a timestamp.

In embodiments, the first current session key may comprise one or more of a plurality of structured session key, wherein the plurality of structured session keys are each derivable from the master cryptographic key, and wherein the first current session key is indirectly derivable from the master cryptographic key.

The method according to any preceding claim, wherein the first identifier and the crypto-data are transmitted in different packets of one or more communications on the same wireless channel or on different wireless channels.

Alternatively, the first identifier and the crypto-data may be transmitted in the same packets of one or more communications.

In embodiments, the method may further comprise: periodically re-transmitting, from the transmit-only device, the first identifier whilst the first current session key is valid; transmitting, from the transmit-only device, the first identifier with forward error correction; transmitting, from the transmit-only device, the crypto-data with forward error correction.

The method may further comprise periodically re-transmitting, from the transmit-only device, the first identifier.

The method may further comprise: generating, at the transmit-only device, a second current session key; generating, at the transmit-only device, updated crypto-data by performing a cryptographic operation on the operational data using the second current session key; transmitting, from the transmit-only device, a second identifier to enable a resource derive the second current session key; transmitting, from the transmit-only device, the updated crypto-data.

As will be appreciated from the foregoing specification, techniques are also described providing a method of deriving a current session key generated at a transmit-only device by a first resource.

The method may further comprise: transmitting, from the first resource to a further resource, the current session key based on an authorisation status of the further resource.

Techniques are also described providing a method of receiving wireless communications at a first resource from a transmit-only device.

In embodiments, the method may further comprise: decrypting, at the first resource, the crypto-data using the first current session key.

In alternative embodiments the method may further comprise: receiving, at the second resource, the first identifier; determining, at the second resource, an authorisation status of the first resource; deriving, at the second resource, the first current session key based on the authorisation status of the first resource; transmitting, from the second resource, the first current session key to the first resource based on the authorisation status of the first resource; receiving, at the second resource, the crypto-data; decrypting, at the second resource, the crypto-data using the first current session key; transmitting, from the second resource, the crypto-data to the first resource.

The method may further comprise: generating, at the transmit-only device, first updated crypto-data by performing a cryptographic operation on operational data using the first current session key; transmitting, from the transmit-only device, the first updated crypto-data.

In embodiments, the method may further comprise: receiving, at the first resource, the first updated crypto-data; decrypting, at the first resource, the first updated crypto-data using the first current session key.

In alternative embodiments, the method may further comprise: receiving, at the second resource, the first updated crypto-data; decrypting, at the second resource, the first updated crypto-data using the first current session key based on the authorisation status of the first resource.

The method may further comprise: generating, at the transmit-only device, a second current session key; generating, at the transmit-only device, second updated crypto-data by performing a cryptographic operation on operational data using the second current session key; transmitting, from the transmit-only device, a second identifier to enable a resource derive the second current session key; transmitting, from the transmit-only device, the second updated crypto-data; receiving, at the first resource, the second identifier; performing, at the first device, one of: deriving the second current session key; and transmitting the second identifier to a second resource when not capable of deriving the second current session key.

The method may further comprise: receiving, at the first resource, the second updated crypto-data; decrypting, at the first resource, the second updated crypto-data using the second current session key; receiving, at the second resource, the second identifier; determining, at the second resource, the authorisation status of the first resource; deriving, at the second resource, the second current session key based on the authorisation status of the first resource; transmitting, from the second resource to the first resource, the second current session key based on the authorisation status of the first resource; receiving, at the second resource, the second updated crypto-data; decrypting, at the second resource, the second updated crypto-data using the second current session key.

In embodiments, the first session key and/or second session key may comprise one or more of a plurality of structured session keys.

The invention claimed is:

1. A method of generating secure wireless communications from a device, the method comprising:
provisioning, on the device, a master cryptographic key, wherein a remote modification, update or replacement of the master cryptographic key is not possible;
generating, at the device, a first current session key, wherein the first current session key comprises a sequence of bits derived from the master cryptographic key;
generating, at the device, operational data;
generating, at the device, crypto-data by performing a first cryptographic operation on the operational data using the first current session key;
transmitting, from the device, a first identifier to enable a resource to identify the sequence of bits of the first current session key as selected bits from a further sequence of bits stored at or generated by the resource;
transmitting, from the device, the crypto-data,
wherein the first identifier and the crypto-data are transmitted on different wireless channels.

2. The method according to claim 1, wherein the master cryptographic key comprises one of: a symmetric key, an asymmetric key and a seed.

3. The method according to claim 1, wherein the first cryptographic operation comprises one or more of: encrypting the operational data with the first current session key and signing the operational data with the first current session key.

4. The method according to claim 1, wherein the first identifier comprises one or more of: an encrypted cryptographic key, a signed cryptographic key, a sequence of bits and a timestamp.

5. The method according to claim 1, wherein the first current session key comprises one or more of a plurality of structured session keys.

6. The method according to claim 5, wherein the plurality of structured session keys are each derivable from the master cryptographic key.

7. The method according to claim 5, wherein the first current session key is indirectly derivable from the master cryptographic key.

8. The method according to claim 1, the method further comprising:
periodically re-transmitting, from the device, the first identifier whilst the first current session key is valid.

9. The method according to claim 1, the method further comprising:
transmitting, from the device, the one or more communications with forward error correction.

10. The method according to claim 1, the method further comprising:
periodically re-transmitting, from the device, the first identifier.

11. The method according to claim 1, the method further comprising:
generating, at the device, a second current session key;
generating, at the device, updated crypto-data by performing a second cryptographic operation on the operational data using the second current session key;
transmitting, from the device, a second identifier to enable a resource derive the second current session key;
transmitting, from the device, the updated crypto-data.

12. A data processing apparatus for generating and transmitting secure wireless communications, comprising:
a processor and memory configured when the processor executes instructions stored in the memory to:
provision on the apparatus a master cryptographic key, wherein a remote modification, update or replacement of the master cryptographic key is not possible;
generate a first current session key, wherein the first current session key comprises a sequence of bits derived from the master cryptographic key;
generate operational data;
generate crypto-data by performing a first cryptographic operation on the operational data using the first current session key;
transmit a first identifier on a first wireless channel to enable a resource to identify the sequence of bits of the first current session key as selected bits from a further sequence of bits stored at or generated by the resource; and
transmit the crypto-data on a second wireless channel, wherein the first wireless channel and the second wireless channel are different.

13. A method of receiving wireless communications at a first resource from a device, the method comprising:
provisioning, at the device, a master cryptographic key, wherein a remote modification, update or replacement of the master cryptographic key is not possible;
generating, at the device, a first current session key, wherein the first current session key comprises a sequence of bits selected from the master cryptographic key;
generating, at the device, operational data;
generating, at the device, crypto-data by performing a cryptographic operation on the operational data using the first current session key;
transmitting, from the device on a first wireless channel, a first identifier to enable a resource to identify the sequence of bits of the first current session key;
transmitting, from the device on a second different wireless channel, the crypto-data;
receiving, at the first resource, the first identifier;
performing, at the first resource, one of:
identifying the sequence of bits of the first current session key as selected bits from a further sequence of bits stored at or generated by the first resource; and
transmitting the first identifier to a second resource when not capable of deriving the first session key.

14. The method according to claim 13, wherein the cryptographic operation comprises an encryption operation, the method further comprising:
decrypting, at the first resource, the crypto-data using the first current session key when the first resource is capable of deriving the first session key.

15. The method according to claim 13, the method further comprising:
receiving, at the second resource, the first identifier when the first resource is not capable of deriving the first session key;
determining, at the second resource, an authorisation status of the first resource;
deriving, at the second resource, the first current session key based on the authorisation status of the first resource;
transmitting, from the second resource, the first current session key to the first resource based on the authorisation status of the first resource.

* * * * *